Dec. 12, 1944.                    A. Y. DODGE                    2,365,062
                    COMBINED ONE-WAY CLUTCH AND BEARING
                           Filed April 8, 1942

Inventor:
Adiel Y. Dodge,
By Dawson, Ooms & Booth,
Atty.

Patented Dec. 12, 1944

2,365,062

UNITED STATES PATENT OFFICE 2,365,062

COMBINED ONE-WAY CLUTCH AND BEARING

Adiel Y. Dodge, Rockford, Ill.

Application April 8, 1942, Serial No. 438,081

6 Claims. (Cl. 192—45.1)

This invention relates to a combined one-way clutch and bearing and more particularly to a simple unit which may be mounted between two races to reduce the friction therebetween for relative rotation in one direction and to prevent relative rotation in the opposite direction.

One of the objects of the invention is to provide a combined one-way clutch and bearing in the form of a small compact unit which can be handled and installed as a unit. Another object of the invention is to provide a combined one-way clutch and bearing in which the bearing and gripper parts are supported by a cage without the sacrifice of space between the races to accommodate the cage.

Another object of the invention is to provide a combined one-way clutch and bearing in which the bearing and gripper parts are resiliently held in contact by a simple spring occupying a minimum of space.

Still another object of the invention is to provide a combined one-way clutch and bearing in which minor irregularities in the race surfaces will not interfere with the bearing action.

Still another object of the invention is to provide a combined one-way clutch and bearing in which provisions are made for ample lubrication of the parts.

The above and other objects and advantages of the invention will be more readily apparent from the following description when read in connection with the accompanying drawing, in which—

Figure 2:
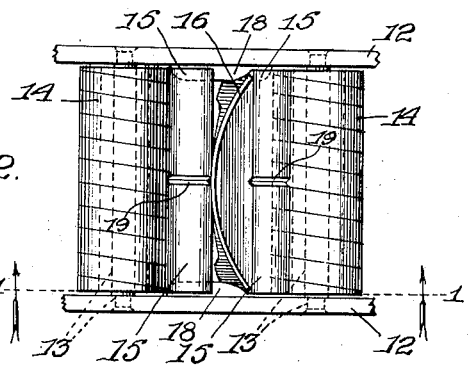
Figure 2 is a partial plan view of the unit of Figure 1.
Figure 1:
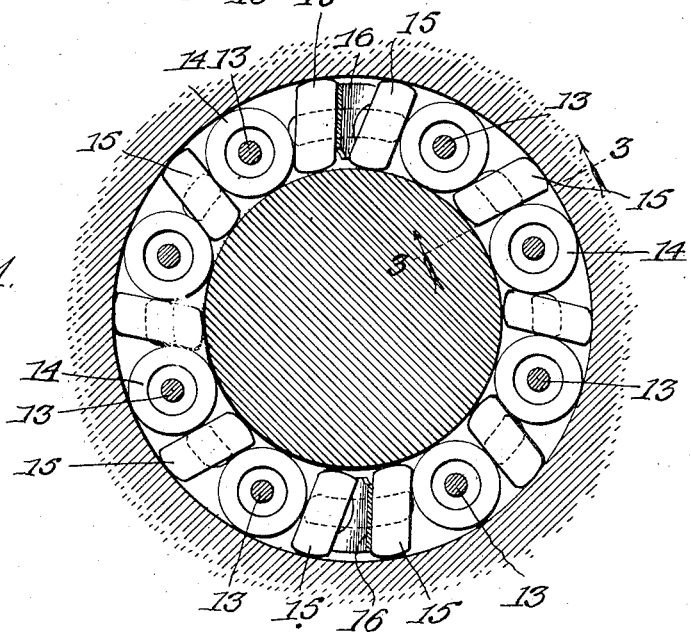
Figure 1 is a side view on the line 1—1 of Figure 2 of a combined one-way clutch and bearing embodying the invention.
Figure 3:
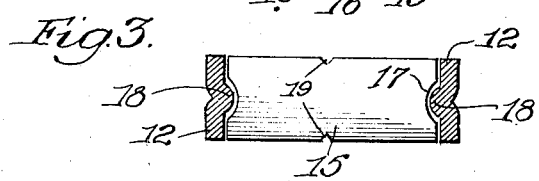
Figure 3 is a partial section on the line 3—3 of Figure 1.
Figure 4:
Figure 4 is an elevation of the spring.

The unit as illustrated is adapted to connect inner and outer races 10 and 11 having facing coaxial surfaces and arranged for relative rotation. The unit comprises a pair of cage members or rings 12 spaced axially of the races and connected by cage bars 13 which are rigidly secured at their opposite ends to the rings 12.

Around each of the cage bars 13 there is loosely mounted a tubular bearing element 14 which is radially resilient and which, as shown, is formed by a strip of metal helically wound into tubular form. With this construction, the bearing elements may yield slightly radially to accommodate minor irregularities in the surface. Furthermore, the small grooves between adjacent convolutions of the strip serve as oil grooves to insure proper lubrication of the bearing surfaces.

Alternately arranged with the bearing elements are a series of grippers 15 formed with flat sides and arcuate ends curved about spaced centers. The grippers are adapted to lie at an angle to a radial line intersecting each gripper so that when the races rotate relatively in one direction the grippers will tilt to a greater extent to clear the race surfaces, while the races rotate in the opposite direction the grippers will tend to swing to a more radial position to bind against the race surfaces. At one or more points of the circumference of the unit a pair of grippers are arranged side by side between two adjacent bearing elements and have mounted between them a spring 16 formed of a strip of spring material arcuately curved and lying substantially parallel to the axis of the unit. At one side the ends of the spring 16 bear on one of the grippers and at the other side the mid portion of the spring bears against the adjacent gripper urging them apart and thereby pressing the bearing elements and grippers into contact throughout the entire circumference of the unit. In this way, the parts are held in engagement so that the grippers will all operate simultaneously and so that no looseness can occur.

In order to hold the grippers and the spring in place in the unit, the ends thereof are formed with transverse grooves 17 adapted to fit over projections 18 pressed in from the sides of the cage members 12. Preferably, the grooves fit loosely over the projections so that free tilting of the grippers will not be interfered with but so that projections will prevent the grippers and spring from falling out of the unit when it is removed from the races. This construction also permits an easy assembly of the unit simply by fitting the grippers radially between the cages and sliding them around until the grooves 17 engage the proper one of the projections 18.

In order to provide for better circulation of lubricant around the race surfaces during operation, each of the grippers may have one or more grooves 19 formed in its arcuate working surfaces. These grooves together with the helical grooves in the rollers provide passages for free flow of lubricant when the unit is operating as a bearing and enable the grippers more easily to break down the oil film on the race surfaces when they are acting to clutch the races together.

While one embodiment of the invention has been shown and described in detail, it will be understood that this is illustrative only and is not intended as a definition of the scope of the invention, reference being had for this purpose to the appended claims.

What is claimed is:

1. A combined one-way clutch and bearing comprising inner and outer races providing spaced coaxial cylindrical surfaces, annular cage members spaced axially of the races, cage bars rigidly connected at their opposite ends to the cage members and forming therewith a rigid cage assembly, tubular bearing elements loosely surrounding the bars and lying between the cylindrical surfaces of the races, and tiltable grippers lying between the cylindrical surfaces of the races alternating with the bearing elements to connect the races in one direction of rotation.

2. A combined one-way clutch and bearing comprising inner and outer races providing spaced coaxial cylindrical surfaces, annular cage members spaced axially of the races, cage bars rigidly connected at their opposite ends to the cage members and forming therewith a rigid cage assembly, tubular bearing elements loosely surrounding the bars and lying between the cylindrical surfaces of the races, tiltable grippers lying between the cylindrical surfaces of the races alternating with the bearing elements to connect the races in one direction of rotation, and resilient means urging the grippers and bearing elements together to keep them in contact.

3. A combined one-way clutch and bearing comprising inner and outer races providing spaced coaxial cylindrical surfaces, annular cage members spaced axially of the races, cage bars rigidly connected at their opposite ends to the cage members and forming therewith a rigid cage assembly, tubular bearing elements loosely surrounding the bars and lying between the cylindrical surfaces of the races, tiltable grippers lying between the cylindrical surfaces of the races alternating with the bearing elements to connect the races in one direction of rotation, and interengaging means on the ends of the grippers and the cage members to hold the grippers in alignment without interfering with tilting thereof.

4. A combined one-way clutch and bearing comprising inner and outer races providing spaced coaxial surfaces, annular cage members spaced axially of the races, cage bars rigidly connected at their opposite ends to the cage members, tubular bearing elements loosely surrounding the bars and lying between the races, grippers lying between the races alternating with the bearing elements, the ends of the grippers being formed with transverse central grooves, and raised projections on the cage members fitting into the grooves to hold the grippers in assembled position.

5. A combined one-way clutch and bearing comprising inner and outer races providing spaced coaxial surfaces, annular cage members spaced axially of the races, cage bars rigidly connected at their opposite ends to the cage members, tubular bearing elements loosely surrounding the bars and lying between the races, grippers lying between the races alternating with the bearing elements, there being a pair of grippers between two adjacent bearing elements, and a curved leaf spring extending axially between said pair of grippers urging them apart, the grippers and leaf spring being formed in their ends with transverse central grooves, and projections on the cage members fitting into the grooves to hold the grippers and spring in assembled position.

6. A combined one-way clutch and bearing comprising inner and outer races providing spaced coaxial surfaces, annular cage members spaced axially of the races, cage bars rigidly connected at their opposite ends to the cage members, tubular resilient bearing members loosely surrounding the cage bars and formed by spirally wound strips, grippers between the races alternating with the bearing elements and engageable with the race surfaces to hold them against relative rotation, and resilient means urging the bearing elements and grippers into contact, the bearing members providing lubricant grooves between adjacent convolutions of the strips and the grippers being formed with grooves in their end surfaces to provide for free lubricant flow therepast.

ADIEL Y. DODGE.